(12) United States Patent
Dean

(10) Patent No.: US 8,117,132 B2
(45) Date of Patent: Feb. 14, 2012

(54) DATING SERVICE SYSTEM AND METHOD INCREASING MEMBER PROFILE DEVELOPMENT AND REDUCING UNWANTED COMMUNICATIONS

(76) Inventor: Peter Joseph Dean, Oakdale, CA (US)

( * ) Notice: Subject to any disclaimer, the term of this patent is extended or adjusted under 35 U.S.C. 154(b) by 43 days.

(21) Appl. No.: 12/386,254

(22) Filed: Apr. 16, 2009

(65) Prior Publication Data

US 2010/0268627 A1    Oct. 21, 2010

(51) Int. Cl.
G06Q 99/00    (2006.01)
G06Q 30/00    (2006.01)
G06Q 40/00    (2006.01)

(52) U.S. Cl. ............................. 705/319; 705/14; 705/40
(58) Field of Classification Search ........................ None
See application file for complete search history.

(56) References Cited

U.S. PATENT DOCUMENTS

| | | | |
|---|---|---|---|
| 5,818,836 A * | 10/1998 | DuVal | 370/389 |
| 6,735,568 B1 | 5/2004 | Buckwalter | |
| 7,117,254 B2 | 10/2006 | Lunt | |
| 7,188,153 B2 | 3/2007 | Lunt | |
| 7,734,545 B1 * | 6/2010 | Fogliano et al. | 705/40 |
| 2001/0051885 A1 * | 12/2001 | Nardulli et al. | 705/6 |
| 2005/0261964 A1 * | 11/2005 | Fang | 705/14 |
| 2006/0059164 A1 | 3/2006 | Smola | |
| 2006/0104426 A1 | 5/2006 | Cataldi | |
| 2008/0288277 A1 * | 11/2008 | Fasciano | 705/1 |
| 2009/0063182 A1 | 3/2009 | Metz | |

OTHER PUBLICATIONS

Internet website http://personals.yahoo.com/; members guidelines link.

* cited by examiner

Primary Examiner — Fahd Obeid

(57) ABSTRACT

The present invention provides a device to increase the number of members in a dating service developing their profiles by providing a financial incentive. The invention further reduces unwanted communications from other members by allowing member recipients of the unwanted communication to receive a fee, paid by the sender, for receiving the communication. The invention further reduces unwanted communications from other members by allowing a member sending a communication to place on the profile of the member receiving the communication a comment which the receiving member cannot remove unless the received fee is returned, if the fee is not returned the member receiving the communication may post a responding comment. The invention further increases the safety of the members by providing the sender and receiver of a message a code that may be used by each to identify the other.

1 Claim, 1 Drawing Sheet

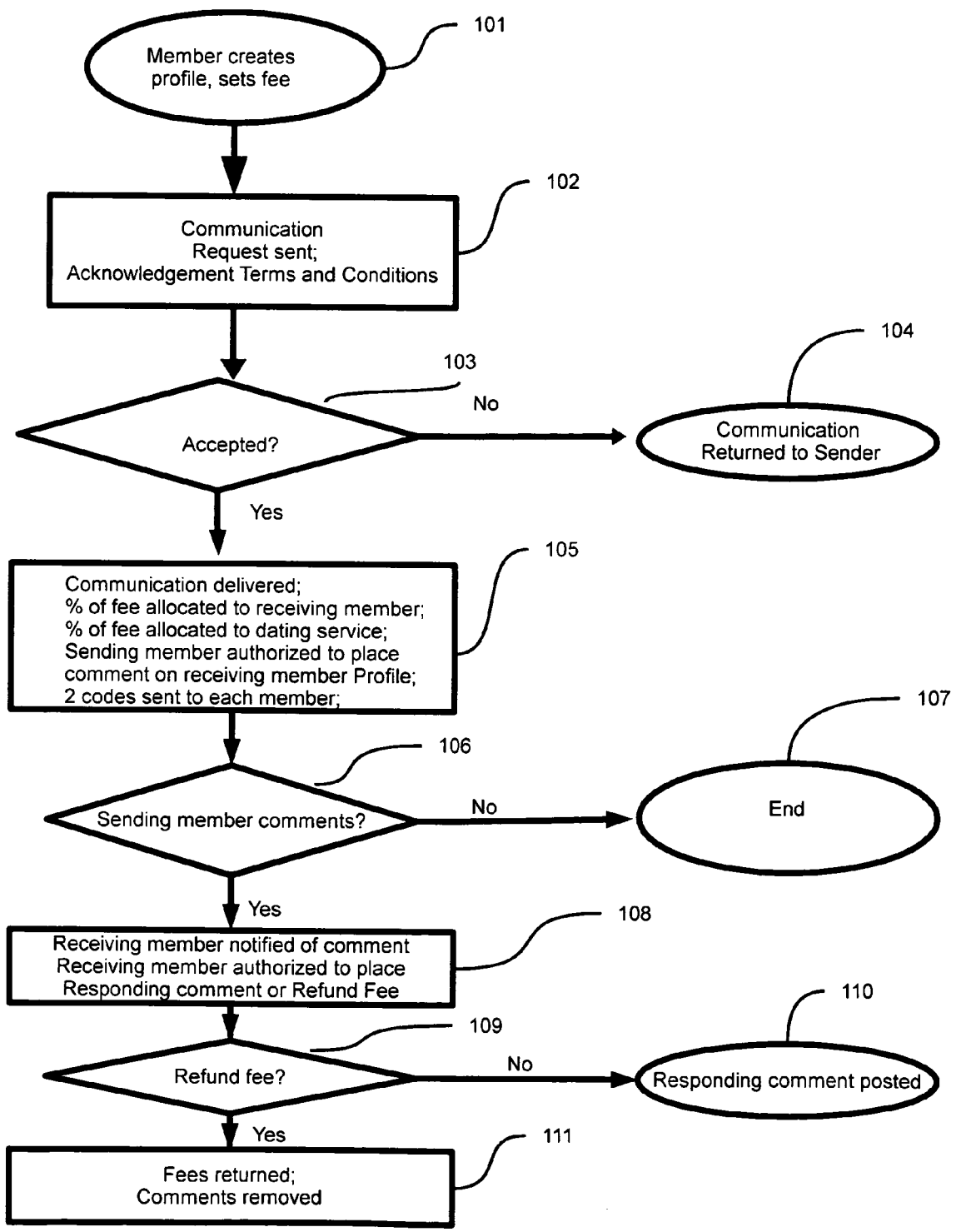
PROCESS FLOW CHART

DATING SERVICE SYSTEM AND METHOD INCREASING MEMBER PROFILE DEVELOPMENT AND REDUCING UNWANTED COMMUNICATIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

As is well known, dating services are a common method for people to help find their significant other. There are now numerous dating services available generally offering a method of communication with potential significant others by allowing a member who pays a fee to the dating service to communicate with other members of the dating service for a defined period of time, for example payment of a monthly fee would allow the member to send communications to any other member during the month in which the fee is paid. Surveying has found that the more time and effort a member expends providing information, about themselves and the people they seek, the more communications the member will receive. The information supplied by the member describing their characteristics and the characteristics of the member they seek is deemed a "Profile". The members that expend time and effort developing their Profile are deemed "Finders". Surveying has further found that a number of members spend little if any time developing Profiles and tend to send brief communications to numerous Finders. These members are deemed "Seekers". The Seekers often fail to consider the Profile of the Finder when sending communications to the Finder and will send a communication where the Seeker characteristics does not match the desired characteristics listed by the Finder.

In the prior art, surveying has found that Finders receive numerous communications from Seekers resulting in frustration to the Finder as they expend further effort and time processing the Seekers communications which do not meet the characteristics described by the Finder. Surveying has further found that Finders become frustrated with communication received by Seekers where the Seeker failed to provide adequate information for the Finder to evaluate the Seeker. The problem with these existing methods is the Finders frustration leads to lowered responses to communications and dissatisfaction with the dating services, while the Seekers become dissatisfied with the lack of response from Finders, resulting in members that may otherwise find each other compatible failing to communicate. A dissatisfied member will abandon the dating service.

BRIEF SUMMARY OF THE INVENTION

The present invention provides a device to increase the number of members in a dating service developing their Profiles by providing a financial incentive. The invention further induces members to carefully evaluate the Profiles of members they desire to communicate with and induces members to increase descriptive information about themselves in communications to other members by providing a financial incentive. The invention further reduces unwanted communications from other members by allowing member recipients of the unwanted communication to receive a fee, paid by the sender, for receiving the communication. The invention further reduces unwanted communications from other members by allowing a member sending a communication to place on the Profile of the member receiving the communication a comment that the receiving member cannot remove unless the received fee is returned, if the fee is not returned the member receiving the communication may post a responding comment.

BRIEF DESCRIPTION OF THE SEVERAL VIEWS OF THE DRAWING

The accompanying drawing, which is incorporated into and constitutes a part of this specification, illustrates one or more embodiments of the present invention and, together with the detailed description, serve to explain the principles and implementations of the invention.

In the drawing:

Drawing Sheet 1 shows a flowchart illustrating a device for increasing member Profile development and reducing unwanted communications in accordance with one embodiment of the present invention.

DETAILED DESCRIPTION OF THE INVENTION

Embodiments of the present invention are described herein in the context of a device for increasing member Profile development and reducing unwanted communications. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawing. The same reference indicators will be used throughout the drawing and the following detailed description to refer to the same or like parts.

In the interest of clarity, not all of the routine features of the implementation described herein are shown and described. It will, of course, be appreciated that in the development of any such actual implementations, numerous implementation specific decisions must be made in order to achieve the developer's specific goals, such as compliance with application and business related constraints, and that these specific goals will vary from one implementation to the other and from one developer to another. Moreover, it will be appreciated that such a development effort might be complex and time-consuming, but would nevertheless be a routine undertaking of engineering for those of ordinary skill in the art having the benefit of this disclosure.

DEFINITIONS

Communication. A transfer of data from one member to another, data can include but is not limited to: an e-mail, a text message, a telephone call, or a facsimile.

Finder. A member of a dating service who seeks communications from other members.

Profile. Information that describes a member or characteristics of a member of a dating service which may be viewed by other members of the dating service. For example, descriptive data may include the name or alias, elements that describe attributes of a member such as gender, marital status, age, weight, photos, or videos.

Seeker. A member of a dating service who sends communications to other members.

The drawing illustrates the general methodology for utilizing the present invention. As shown in the drawing a person who becomes a member may create one Profile (101). In the preferred embodiment limiting each person to one Profile is accomplished by requiring a taxpayer identification number, Government Issued Identification Number, and valid e-mail address for each membership. The member (member #1, a Finder) sets the amount to be charged to another member (member #2, a Seeker) for the sending of a communication to member #1. As shown in the drawing (102) member #2 may than request to send a communication to member #1 provided member #2 acknowledges the Terms and Conditions for the use of the service including acknowledgment that the fee is not contingent upon a response or any other action by member #1. With acknowledgment by member #2, member #1 is alerted of the communication and provided the option to accept the communication and percentage of the fee charged to member #2 (103). At this point (104), if member #1 rejects the communication the fee is returned to member #2 and notice is sent to member #2 of the non-acceptance. If member #1 accepts the communication (105), the communication is delivered, a percentage of the fee (the percentage set by the dating service) is credited to member #1, the remaining percentage is credited to the dating service, member #2 is authorized to place a comment on the Profile of member #1, and two codes are sent to each member. The two codes may be utilized by member #1 and member #2 to verify each other in the event they decide to communicate further. Member #1 provides the first code to member #2, after member #2 verifies the accuracy of the code, member #2 provides the second code to member #1. At this point (106) if member #2 elects to not place a comment the process ends (107). If member #2 elects to place a comments (108) than member #1 is notified that a comment has been placed upon member #1's Profile. At this point (109) member #1 elects to either refunds the fee or place a response to the comment. If member #1 refunds the fee (111) than the comment from member #2 is removed from member #1's Profile. If member #1 responds (110) than the responding comment is posted with member #2's comment.

The embodiments illustrated and discussed herein are intended only to teach those skilled in the art the best way known by the inventor to make and use the invention. Nothing in the specification should be considered as limiting the scope of the present invention. Changes could be made by those skilled in the art to produce equivalent methods without departing from the invention. The present invention should only be limited by the following claims and their legal equivalents.

What is claimed is:

1. A dating service device to increase member profile development and decrease unwanted communications, comprising:
 a) a data storage repository, means for storing the data which will store data accordingly:
 authorizing each member the creation of one profile by requiring the submittal of a taxpayer identification number, government issued identification number, and e-mail address per membership and allowing one profile per membership;
 b) the data storage repository, means for storing the data which will store the data accordingly:
 each member setting a fee, to be charged to the member sending the communication, for accepting a communication from the member sending the communication;
 c) data controller, means for changing data in the data storage repository which will control the data accordingly:
 if a second member elects to send a communication to a first member, the second member first agrees to the terms of the communication including the fee and requests to send a communication to the first member then after the second member sends a communication to the first member the first member is given the option to accept or reject the communication;
 if the first member rejects the communication no fee is charged or the fee is either refunded or otherwise returned to the second member and the message is returned to the second member;
 if the first member accepts the communication by the second member, in response to the initiation of the communication, two codes are sent to the first member and the second member;
 if the first member accepts the communication by the second member a percentage of the fee determined by the dating service is credited to the first member and the remaining percentage of the fee is credited to the dating service;
 if the first member accepts a communication by a second member the second member is authorized to place a comment on the first members profile that the first member cannot remove unless the fee is refunded or otherwise returned;
 if the second member comments, the first member is allowed to place a responding comment to the second member's comment;
 whereby the elements described constitute a device for increasing member profile development and decreasing unwanted communication in a dating service apparatus.

* * * * *